United States Patent
Hosoda (10) Patent No.: US 10,635,361 B2
(45) Date of Patent: Apr. 28, 2020

(54) IMAGE FORMING APPARATUS, METHOD OF CONTROLLING SAME, AND STORAGE MEDIUM

(71) Applicant: CANON KABUSHIKI KAISHA, Tokyo (JP)

(72) Inventor: Yasuhiro Hosoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/279,240

(22) Filed: Feb. 19, 2019

(65) Prior Publication Data

US 2019/0258427 A1 Aug. 22, 2019

(30) Foreign Application Priority Data

Feb. 21, 2018 (JP) ................................. 2018-029051

(51) Int. Cl.
*H04N 1/00* (2006.01)
*G06F 3/12* (2006.01)
*G06F 16/51* (2019.01)

(52) U.S. Cl.
CPC .......... *G06F 3/1204* (2013.01); *G06F 3/1222* (2013.01); *G06F 3/1238* (2013.01); *G06F 3/1285* (2013.01); *G06F 16/51* (2019.01)

(58) Field of Classification Search
CPC .... G06F 3/1204; G06F 3/1238; G06F 3/1285; G06F 3/1222; G06F 16/51

USPC .................................................... 358/1.14
See application file for complete search history.

(56) References Cited

U.S. PATENT DOCUMENTS

| 8,245,290 | B2 | 8/2012 | Hosoda | |
|---|---|---|---|---|
| 9,542,551 | B2 | 1/2017 | Hosoda | |
| 9,665,322 | B2 | 5/2017 | Lin | |
| 10,148,644 | B2 | 12/2018 | Hosoda | |
| 2015/0146253 | A1* | 5/2015 | Uruma | H04N 1/00832 358/1.15 |
| 2016/0004492 | A1 | 1/2016 | Lin | |

FOREIGN PATENT DOCUMENTS

JP 2016026910 A 2/2016

* cited by examiner

*Primary Examiner* — Saeid Ebrahimi Dehkordy
(74) *Attorney, Agent, or Firm* — Venable LLP

(57) ABSTRACT

An image forming apparatus saves, in a user database, a user ID used in user authentication processing and a department ID in association with each other, and saves, in a department database, the department ID and a number of sheets printed by a print unit in association with each other. The image forming apparatus performs deletion control to: in conjunction with accepting a deletion instruction for deleting the user ID and the department ID that are saved in the user database, delete the user ID and the department ID; and from out of department IDs saved in the department database, exclude a department ID not deleted from the user database by the deletion instruction to thereby execute processing to identify an unnecessary department ID, and delete the identified department ID from the department database.

8 Claims, 4 Drawing Sheets

USER ID MANAGEMENT

[REGISTER] [EDIT] [DELETE] [DELETE ALL]

| | USER ID | PASSWORD | IC CARD ID | DEPARTMENT ID |
|---|---|---|---|---|
| ☐ | Administrator | ******** | ABC1234 | 7654321 |
| ☐ | alice | ******** | ABC1235 | 1001 |
| ☐ | bob | ******** | ABC1236 | 1002 |
| ☐ | carol | ******** | ABC1237 | 1003 |
| ☐ | dave | ******** | ABC1238 | 1004 |
| ☐ | eve | ******** | ABC1239 | 1005 |
| ☐ | falcon | ******** | ABC1240 | 1006 |
| ☐ | george | ******** | ABC1241 | 1007 |

FIG. 3B

DEPARTMENT ID MANAGEMENT

[REGISTER] [DELETE] [COUNT CLEAR]

| | DEPARTMENT ID | COPY | | | PRINT | | |
|---|---|---|---|---|---|---|---|
| | | COLOR | MONOCHROME | TOTAL | COLOR | MONOCHROME | TOTAL |
| ☐ | 1001 | 100 | 100 | 200 | 5 | 5 | 10 |
| ☐ | 1002 | 120 | 110 | 230 | 100 | 50 | 150 |
| ☐ | 1003 | 10 | 20 | 30 | 10 | 0 | 10 |
| ☐ | 1004 | 10 | 0 | 10 | 10 | 20 | 30 |
| ☐ | 1005 | 5 | 5 | 10 | 120 | 110 | 230 |
| ☐ | 1006 | 100 | 50 | 150 | 100 | 50 | 150 |
| ☐ | 1007 | 0 | 0 | 0 | 0 | 0 | 0 |
| ☐ | 7654321 | 1 | 0 | 1 | 0 | 0 | 0 |

FIG. 3C

DATA MANAGEMENT

[IMPORT] [EXPORT]

| | DATABASE |
|---|---|
| ☐ | SETTING DB |
| ☐ | USER DB |
| ☐ | DEPARTMENT DB |

IMAGE FORMING APPARATUS, METHOD OF CONTROLLING SAME, AND STORAGE MEDIUM

BACKGROUND OF THE INVENTION

Field of the Invention

The present invention relates to an image forming apparatus, a method of controlling the same, and a storage medium.

Description of the Related Art

An image forming apparatus provided with a copy, print, or facsimile function may have a management function for managing a number of copied sheets or a number of printed sheets for each department to which users belong. By such a management function in the image forming apparatus, in a case where a user who used a user ID to login to the image forming apparatus performs copying, for example, a number of copied sheets corresponding to a department ID associated with the user ID is incremented.

Typically, a department ID is managed in association with one or more user IDs. By associating one or more user IDs with one department ID, it is possible to tally a number of copied sheets or a number of printed sheets for each department. By associating one or more user IDs with one department ID, it is possible to tally a number of copied sheets or a number of printed sheets for each user by using the department ID. Japanese Patent Laid-Open No. 2016-26910 proposes an image forming apparatus that automatically registers relevance information between a user ID and a department ID, based on attribute information of an inputted print job.

In an office, if an employee leaves due to a transfer or employment separation, a user ID registered for the employee to use may be deleted from the image forming apparatus. As described above, in an office that uses department IDs to tally a number of copied or printed sheets for each user, a department ID associated with a user ID will become unnecessary in accompaniment of deletion of the user ID. However, deleting both of a user ID and a department ID normally requires a user to manually perform an operation to delete the department ID in addition to an operation to delete the user ID, and cumbersome operations can be required for the user.

SUMMARY OF THE INVENTION

The present invention was conceived in view of the above described issues. The present invention provides a technique for reducing the burden of managing a department ID registered in an image forming apparatus.

According to one aspect of the present invention, there is provided an image forming apparatus, comprising: a print unit; a first saving unit configured to save, in a user database, a user ID used in user authentication processing and a department ID in association with each other; a second saving unit configured to save, in a department database, the department ID and a number of sheets for print material printed by the print unit in association with each other; and a deletion control unit configured to perform deletion control to: in conjunction with accepting a deletion instruction for deleting the user ID and the department ID that are saved in the user database, delete the user ID and the department ID which are deletion targets from the user database; and from out of department IDs saved in the department database, exclude a department ID that is not deleted from the user database by the deletion instruction to thereby execute processing to identify an unnecessary department ID, and delete the identified department ID from the department database.

According to still another aspect of the present invention, there is provided a method of controlling an image forming apparatus, the method comprising: saving, in a user database, a user ID used in user authentication processing and a department ID in association with each other; saving, in a department database, the department ID and a number of sheets for print material printed by a print unit in association with each other; and performing deletion control to: in conjunction with accepting a deletion instruction for deleting the user ID and the department ID that are saved in the user database, delete the user ID and the department ID which are deletion targets from the user database; and from out of department IDs saved in the department database, exclude a department ID that is not deleted from the user database by the deletion instruction to thereby execute processing to identify an unnecessary department ID, and delete the identified department ID from the department database.

According to still another aspect of the present invention, there is provided a non-transitory computer-readable storage medium storing a computer program for causing a computer to execute a method of controlling an image forming apparatus, the method comprising: saving, in a user database, a user ID used in user authentication processing and a department ID in association with each other; saving, in a department database, the department ID and a number of sheets for print material printed by a print unit in association with each other; and performing deletion control to: in conjunction with accepting a deletion instruction for deleting the user ID and the department ID that are saved in the user database, delete the user ID and the department ID which are deletion targets from the user database; and from out of department IDs saved in the department database, exclude a department ID that is not deleted from the user database by the deletion instruction to thereby execute processing to identify an unnecessary department ID, and delete the identified department ID from the department database.

By virtue of the present invention, it is possible to reduce the burden of managing a department ID registered in an image forming apparatus.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<MFP Hardware Configuration>

Figure 1:
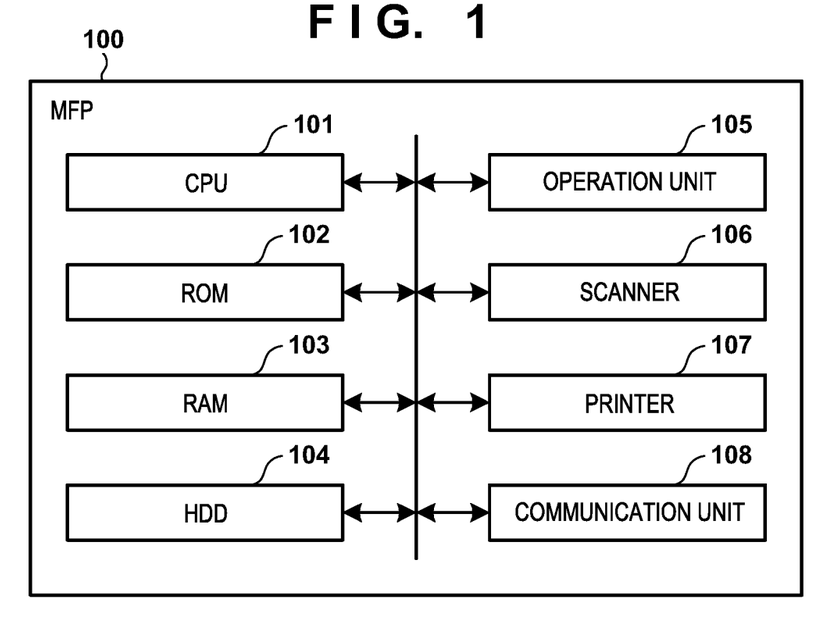
FIG. 1 is a block diagram which illustrates an example of a hardware configuration of an MFP.

FIG. 1 is a block diagram illustrating a hardware configuration example of a multi-function peripheral (an MFP) according to an embodiment of the present invention. An MFP 100 is provided with a CPU 101, a ROM 102, a RAM 103, an HDD 104, an operation unit 105, a scanner 106, a printer 107, and a communication unit 108. In the present embodiment, the MFP 100 is an example of an image forming apparatus.

The CPU 101 controls overall operation of the MFP 100. The RAM 103 is a volatile memory, and is used as a work area for the CPU 101, or a temporary storage area for loading various control programs that are stored in the ROM 102 or the HDD 104. The ROM 102 is a nonvolatile memory, and stores, for example, a boot program for the MFP 100. The HDD (hard disk drive) 104 is a nonvolatile storage apparatus, and stores various programs such as a control program for the MFP 100, an OS (operating system) program, and application programs.

The CPU 101 reads and executes the boot program stored in the ROM 102 when the MFP 100 is activated. This boot program is a program for reading the OS program stored in the HDD 104, and loading it into the RAM 103.

After execution of the boot program, the CPU 101 executes the OS program that was loaded into the RAM 103. Furthermore, the CPU 101 also stores in the RAM 103 data that is used in execution of the control program, and performs reading and/or writing with respect to this data.

Note that, in the present embodiment, although description is given of an example in which one CPU 101 executes various processing to be described later, there is no limitation to this. For example, the MFP 100 may be configured such that a plurality of CPUs or MPUs (microprocessors) cooperate to execute various processing. In addition, the MFP 100 may be configured to use a hardware circuit such as an ASIC (Application Specific Integrated Circuit) or an FPGA (Field-Programmable Gate Array) to execute at least a part of various processing described later.

The operation unit 105 is provided with a keyboard and a liquid crystal display unit that has a touch panel function, and displays various screens. A user can input instructions and information to the MFP 100 via the operation unit 105. The scanner 106 reads an image of an original to generate image data corresponding to the image. Image data generated by the scanner 106 is saved in the HDD 104 or transmitted to an external apparatus via the communication unit 108, or is used for printing of the image by the printer 107. The printer 107 forms (prints) an image on a sheet, based on image data saved in the HDD 104, image data received from an external apparatus via the communication unit 108, or image data generated by the scanner 106.

The communication unit 108 is connected to a wired LAN (local area network), and can communicate with an external apparatus via the wired LAN. Note that the communication unit 108 may be connected to a telephone line and perform facsimile communication. In addition, the communication unit 108 may perform wireless communication (for example, wireless communication of a wireless LAN standard such as IEEE 802.11a/b/g/n/ac) with an external apparatus such as a mobile terminal or an external access point.

<MFP Software Configuration>

Figure 2:
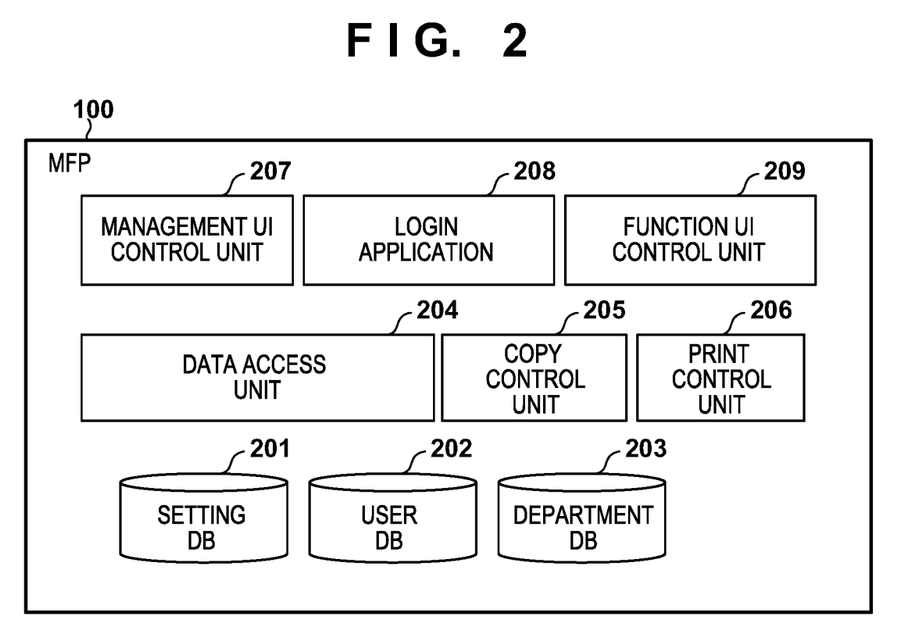
FIG. 2 is a block diagram which illustrates an example of a software configuration of an MFP.

FIG. 2 is a block diagram that illustrates an example of a software configuration of the MFP 100. The functions of each block illustrated in FIG. 2 are realized by the CPU 101 reading a control program stored in the ROM 102 or the HDD 104 and executing it.

A setting DB (database) 201 stores settings of the MFP 100. A user DB 202 stores user information for users who login to the MFP 100, and stores user IDs that are registered to the MFP 100. A department DB 203 stores a department ID that is registered to the MFP 100, and is used to tally a number of printed sheets in accordance with copying or printing performed with the department ID designated. Data managed by these DBs is stored in the HDD 104. Note that "department" in the present specification indicates units of associations to which users belong that are configured by one or more users, and can include a team or a group, for example. In addition to being used to count a number of sheets for printing or copying per department, department IDs may be used to restrict functions in the MFP 100 that can be used per department, for example.

A data access unit 204 provides an API (Application Programming Interface) for accessing data of each DB described above, and accesses each DB described above. A management UI control unit 207, a login application 208, and a function UI control unit 209 can access each DB via the API provided by the data access unit 204.

Figure 3A:
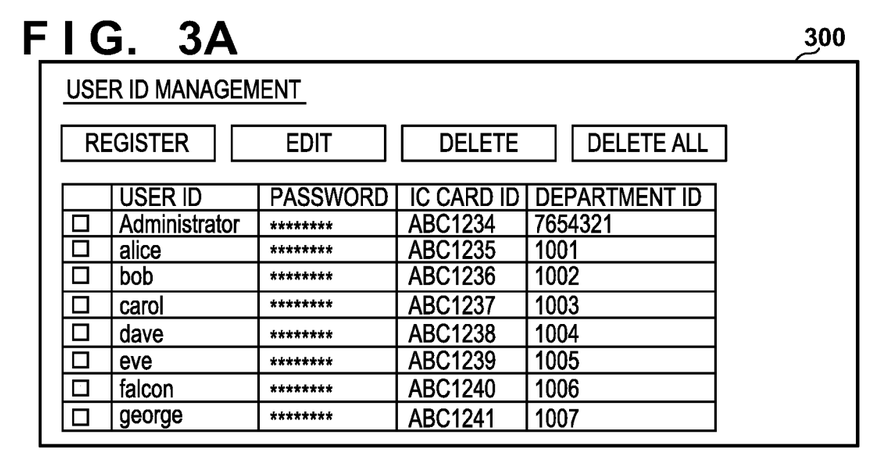
FIG. 3A through FIG. 3C are views which illustrates an example of a UI screen displayed by a management UI control unit.
Figure 3B:
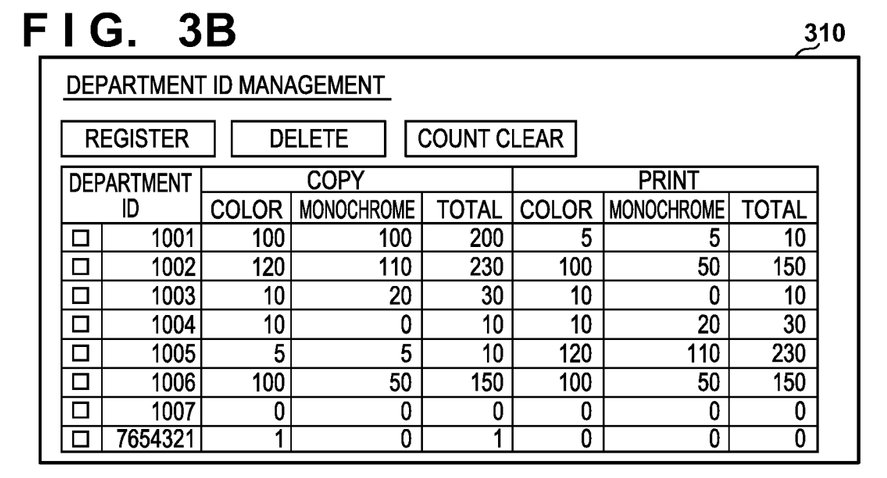
Figure 3C:
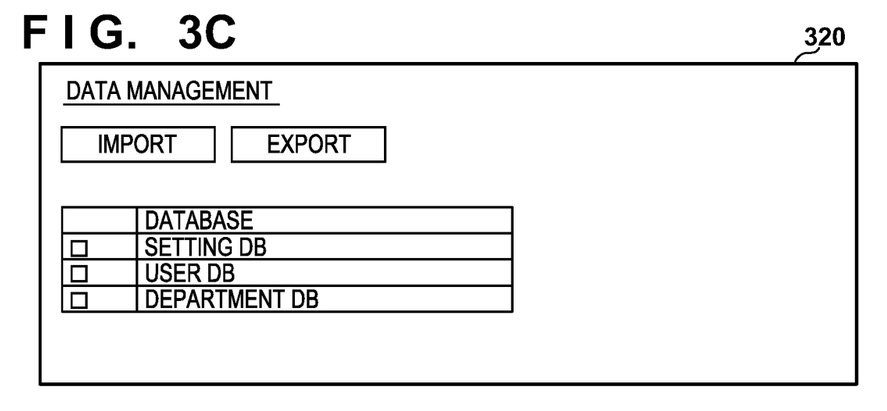

The management UI control unit 207 provides a UI screen for managing the MFP 100. The management UI control unit 207 has a Web server function for communicating by HTTP. It can provide a UI screen generated in HTML in response to access from a host PC or a browser. In the present embodiment, the management UI control unit 207 provides a UI screen that has the following functions, for example:

a UI screen for performing settings of the MFP 100 (not shown);

a UI screen for registering, editing or deleting user information (FIG. 3A);

a UI screen for registering or deleting a department ID, and for displaying a number of printed sheets and a number of copied sheets for each department ID (FIG. 3B); and a UI screen for bulk import or export of at least one of settings, user IDs and department IDs of the MFP 100 (FIG. 3C).

The management UI control unit 207 manages, a user ID that indicates a user of the MFP 100, and a department ID indicating the department to which the user belongs, in association with each other. The management UI control unit 207 manages one or more user IDs that are stored in the user DB 202, and one or more department IDs that are stored in the department DB 203. The one or more user IDs and the one or more department IDs respectively stored in the user DB 202 and the department DB 203 are registered in the MFP 100 using the UI screens described above, and can be used to count the number of sheets for printing and copying for each department ID.

The login application 208 displays, on the operation unit 105, a login screen for a login operation. The login application 208 executes user authentication by obtaining a user ID and password inputted using the login screen, and matching them with data stored in the user DB 202, for example. Note that the user authentication may be executed by using an ID read by a card reader (not shown) from an IC card that a user holds, instead of a user ID and a password.

If the user authentication succeeds, the login application 208 logs the user into the MFP 100, and causes the display of the operation unit 105 to transition to the UI screen provided by the function UI control unit 209. In addition, the login application 208 provides the function UI control unit 209 with, as logged-in user information, user information (for example, a user ID and a department ID) of the user who logged into the MFP 100.

The function UI control unit 209 provides a UI screen for a user to use the copy function or the print function. The function UI control unit 209 instructs a copy control unit 205 or a print control unit 206 to execute a job in accordance with an operation by the user in a UI screen. At that time, the function UI control unit 209 conveys the department ID of the user logged into the MFP 100 to the copy control unit 205 or the print control unit 206.

The copy control unit 205 executes a copy job by controlling the scanner 106 and the printer 107 in accordance with an instruction from the function UI control unit 209. After execution of a copy job completes, the copy control unit 205 accesses the department DB 203, and increments (increases) a count value of a number of copied sheets for the department ID conveyed from the function UI control unit 209.

The print control unit 206 executes a print job by controlling the printer 107 in accordance with an instruction from the function UI control unit 209. After execution of a print job completes, the print control unit 206 accesses the department DB 203, and increments (increases) a count value of a number of printed sheets for the department ID conveyed from the function UI control unit 209. In addition, upon receiving a print job from an external apparatus through the communication unit 108, the print control unit 206 executes the received print job. After execution of a print job completes, the print control unit 206 accesses the department DB 203, and increments the count value for the number of printed sheets for the department ID included in the print job.

<Examples of UI Screens>

FIG. 3A illustrates a UI screen 300 for registering, editing, or deleting user information that includes a user ID. The management UI control unit 207 registers, edits or deletes user information stored in the user DB 202 in accordance with an operation of a user on the UI screen 300. Note that the management UI control unit 207 accesses the user DB 202 via the data access unit 204 (uses the API provided by the data access unit 204) to perform processing with respect to the user database.

The user can use the UI screen 300 to register, in the MFP 100, a user ID (a user identifier), and a password, an IC card ID, and a department ID (a department identifier) that are associated with the user ID. The management UI control unit 207 registers data inputted using the UI screen 300 to the user DB 202. In the UI screen 300, the user can select a checkbox corresponding to a user ID and press a "delete" button to thereby designate the user ID as a deletion target. In addition, in the UI screen 300, the user can press a "delete all" button to designate user IDs for all users as deletion targets, except for built-in user IDs (for example, a user ID for an administrator user). The management UI control unit 207 deletes user IDs designated as deletion targets, from the user DB 202.

FIG. 3B illustrates a UI screen 310 for registering or deleting a department ID, and for displaying numbers of printed and copied sheets for each department ID. The management UI control unit 207 registers, edits or deletes a department ID stored in the department DB 203, in accordance with an operation of a user on the UI screen 310. The management UI control unit 207 accesses the department DB 203 via the data access unit 204 (uses the API provided by the data access unit 204) to perform processing with respect to the department DB 203.

The user can use the UI screen 310 to register a department ID (a department identifier) to the MFP 100. The management UI control unit 207 registers a department ID inputted using the UI screen 310 to the department DB 203. The department ID is an identifier that is configured by numerals, for example. Note that the department ID may be configured by numerals and alphabetical letters. When a department ID is newly registered, a count value for a number of copied sheets and a count value for a number of printed sheets are saved in association with the department ID in the department DB 203. These count values are initialized to 0 in advance. Subsequently, when an instruction to execute copying or printing is performed with a department ID designated, the respective count value associated with the designated department ID (corresponding to the designated department ID) is incremented.

FIG. 3B illustrates an example in which the number of copied sheets is respectively counted for color copying and monochrome copying, and similarly the number of printed sheets is respectively counted for color printing and monochrome printing. Typically, tally information that includes such count values is periodically collected, and used to identify costs incurred by copying or printing for departments or individuals.

In addition, the user can use the UI screen 310 to select a department ID, and press a "count clear" button to thereby instruct that the count value corresponding to the selected department ID be cleared. In addition, the user can use the UI screen 310 to select the department ID and press a "delete" button to instruct that the selected department ID and information (such as the count value) saved in association with the department ID be deleted.

A UI screen 320 illustrated in FIG. 3C is for bulk import or export of data stored in the setting DB 201, the user DB 202, and the department DB 203. In accordance with a user operation on the UI screen 320, the management UI control unit 207 exports data stored in a respective DB to a file, or imports data to a respective DB from a file that had been exported.

The user can use the UI screen 320 to select one or more DBs to be backed up and select "export" to thereby instruct that data stored in the DB to be backed up be exported to a file. In addition, the user can select a DB to import to, designate a file exported from the MFP 100 or another MFP, and select "import" to instruct that data be imported to the DB from the file. Note that, when importing data to a DB, the management UI control unit 207 deletes all data stored in the DB to import to, and then imports the data from the file to the DB.

For example, the management UI control unit 207 can execute processing for deleting all user IDs that were registered in the MFP 100 from the user DB 202, and importing user ID data from a file that is an import source. In addition, the management UI control unit 207 can execute processing for deleting all department IDs that were registered in the MFP 100 from the department DB 203, and importing department ID data from a file that is an import source.

<API Example>

Figure 4:
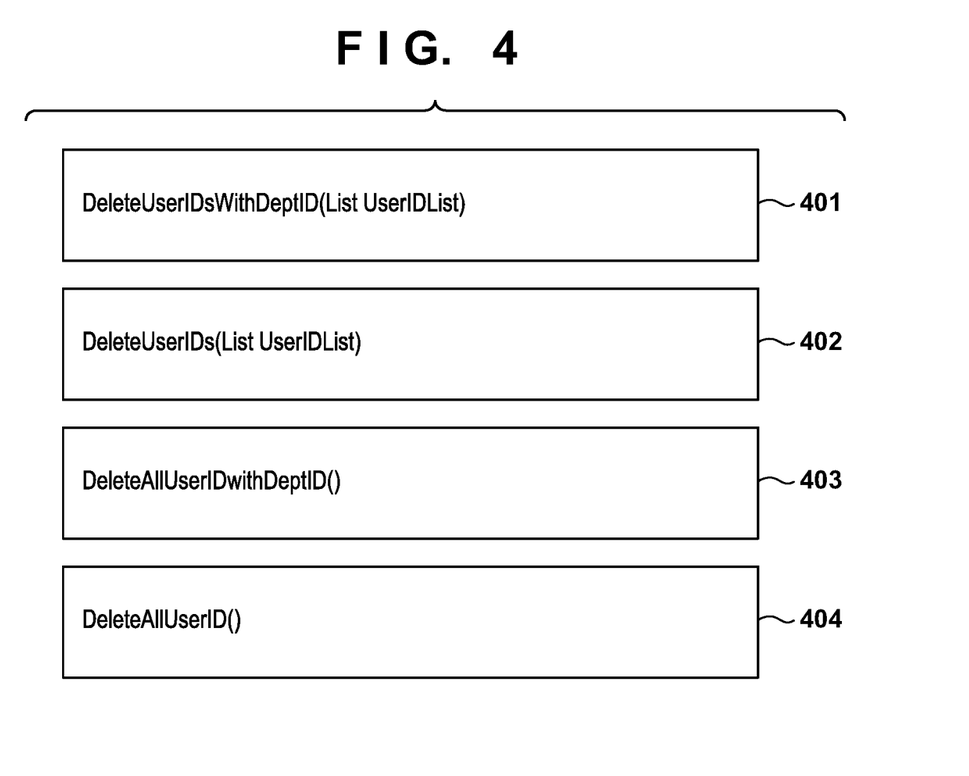
FIG. 4 is a view which illustrates an example of an API for deleting a user ID.

FIG. 4 illustrates an example of an API, provided by the data access unit 204, for deleting user IDs from the user DB 202. In the present embodiment, the management UI control unit 207 selectively uses the APIs 401 through 404 illustrated in FIG. 4 to delete user IDs from the user DB 202 and delete department IDs from the department DB 203.

The API 401 is for deleting user IDs designated by an input parameter from the user DB 202, and deleting a department ID from the department DB 203 that is linked with the user IDs. The API 402 is for deleting user IDs designated by an input parameter from the user DB 202 without deleting a department ID from the department DB 203.

The API 403 is for deleting all user IDs from the user DB 202, and deleting department IDs from the department DB 203 that are linked with the user IDs. An API 404 is for deleting all user IDs from the user DB 202 without deleting department IDs from the department DB 203. Note that the APIs 401 to 404 operate so as not to delete built-in user IDs, as described above.

In the present embodiment, the API 401 is an example of a first API for deleting a user ID from a first data base (the user DB 202), and also deleting a department ID associated with the user ID from a second data base (the department DB 203). In addition, the API 402 is an example of a second API for deleting a user ID from a first data base (the user DB 202), without deleting a department ID associated with the user ID from a second data base (the department DB 203).

<Processing for Deleting User IDs>

Figure 5:
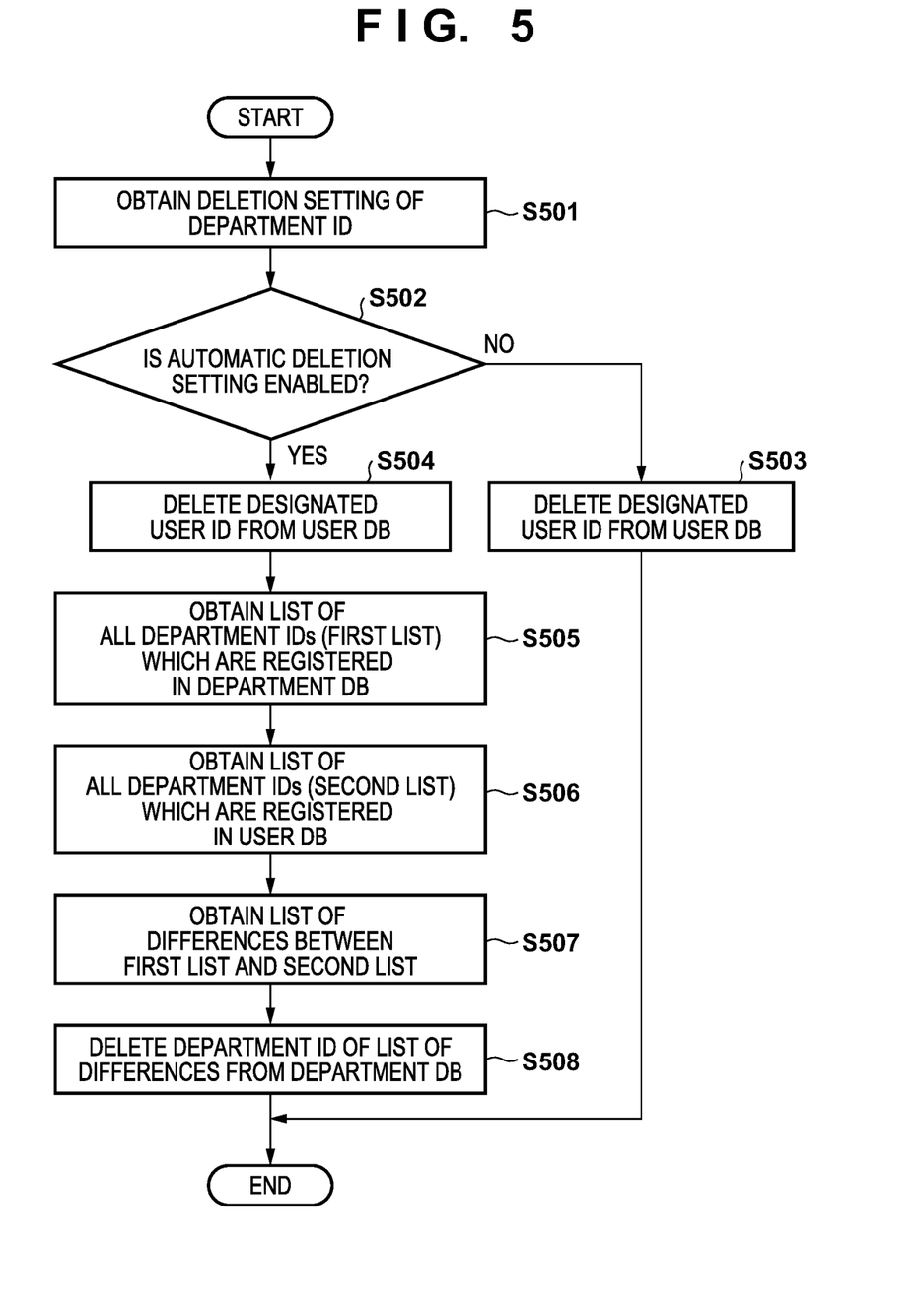
FIG. 5 is a flowchart which illustrates a procedure of processing for deleting a user ID.

FIG. 5 is a flowchart illustrating a procedure of processing for deleting user IDs that is executed by the CPU 101 in the MFP 100. The processing of each step of FIG. 5 are realized by the CPU 101 reading a control program stored in the ROM 102 or the HDD 104 and executing it.

When a UI screen (for example, the UI screen 300) displayed on the operation unit 105 by the management UI control unit 207 is used by a user to instruct the deletion of one or more user IDs, the CPU 101 executes the processing for deleting user IDs in accordance with the procedure of FIG. 5.

Firstly, in step S501, the CPU 101 refers to the setting DB 201 to obtain a setting related to deletion of a department ID. The CPU 101 sets, in accordance with a user instruction, whether or not to delete a department ID when deleting a user ID (deleting a department ID in conjunction with deletion of a user ID), and stores this setting in the setting DB 201 in advance. Next, in step S502, the CPU 101 determines, based on the obtained setting, whether an automatic deletion setting for deleting a department ID in conjunction with deletion of a user ID is enabled. If the automatic deletion setting is disabled, the CPU 101 advances the processing to step S503, and if the automatic deletion setting is enabled, the CPU 101 advances the processing to step S504. In the following processing, the CPU 101 (the management UI control unit 207) selects and uses the API 401 or the API 402 in accordance with the automatic deletion setting.

If the automatic deletion setting for department IDs is disabled (in other words, if performing deletion of a department ID is not set), the CPU 101 does not delete a department ID after deleting a user ID. Specifically, in step S503, the CPU 101 deletes the user ID designated by the deletion instruction and information saved in association with the user ID (information such as the password illustrated in FIG. 3A) from the user DB 202. Note that the deletion processing of step S503 is realized by the API 402. Subsequently, the CPU 101 ends the processing without deleting a department ID.

In contrast, if the automatic deletion setting for department IDs is enabled (in other words, if performing deletion of a department ID is set), the CPU 101 deletes a department ID after deleting a user ID. Specifically, in step S504, similarly to step S503, the CPU 101 deletes the user ID designated by the deletion instruction and information saved in association from the user DB 202. After deletion for the user ID, in step S505 through step S508, the CPU 101 deletes, from the one or more department IDs stored in the department DB 203, a department ID that is not associated with any user ID. In this deletion processing, the CPU 101 deletes the department ID associated with the user ID deleted in step S504, from the one or more department DBs stored in the department DB 203.

Specifically, in step S505, the CPU 101 refers to the department DB 203, and obtains a list of all of the department IDs registered in the department DB 203 as a first list. Furthermore, in step S506, the CPU 101 refers to the user DB 202, and obtains a list of all department IDs registered in the user DB 202 (in other words, a list of department IDs associated with each user ID registered in the user DB 202) as a second list.

The CPU 101 detects a department ID that is not associated with any user ID based on a difference between the first list obtained in step S505 and the second list obtained in step S506. Specifically, in step S507, the CPU 101 obtains a list of differences between the first list obtained in step S505 and the second list obtained in step S506. Specifically, each department ID included in the second list is deleted from the department IDs included in the first list to obtain the first list after the deletions as the list of differences. The list of differences is a list of department IDs that are included in the first list but not included in the second list, and corresponds to a list of department IDs that are not associated with any user ID in the user DB 202.

Subsequently, in step S508, the CPU 101 deletes each department ID included in the obtained list of differences and the information associated with the department IDs (count values for the number of printed sheets and the number of copied sheets) from the department DB 203, and ends this processing. Note that the deletion processing of step S504 to step S508 is realized by the API 401.

In the deletion processing described above, it is possible to change the order of the steps of FIG. 5 as appropriate. For example, the processing of step S506 may be executed before the processing of step S505, and the processing of step S505 or the processing of step S506 may be executed in parallel. In addition, the processing of step S503 and step S504 may be executed before the processing of step S502.

As described above, in the present embodiment, when deletion of a user ID is instructed by a user, the CPU 101 (the management UI control unit 207) deletes the user ID, which is designated as a deletion target, from the user DB 202. In other words, the CPU 101 deletes a user ID designated as a deletion target from out of the one or more user IDs managed in a state of having been stored in the user DB 202. Furthermore, after deleting the user ID, the CPU 101 deletes a department ID that is not associated with any user ID, from out of the one or more department IDs managed in a state of having been stored in the department DB 203. In this way, the MFP 100 of the present embodiment automatically deletes a department ID that is not associated with any user ID, in conjunction with deletion of a user ID. By this, when deleting a department ID that has become unnecessary in accompaniment of deletion of a user ID, it is possible to not need a user operation to delete the department ID. Accordingly, by virtue of the present embodiment, it is possible to reduce the burden of managing department IDs registered in the MFP 100.

In addition, after the deletion of a user ID, the MFP 100 of the present embodiment sets a department ID not associated with any user ID as a target of deletion. Accordingly, if a department ID associated with a deleted user ID is also associated with another user (is used by another user), the department ID is not deleted. Accordingly, a user can use the aforementioned function for deleting a department ID in conjunction with deletion of a user ID.

In addition, the MFP 100 of the present embodiment is provided with a setting (an automatic deletion setting) for deleting a department ID in conjunction with deletion of a user ID. Consequently, a user who wishes to keep tally information of a number of sheets for copying and printing per department after the deletion of a user ID can disable the automatic deletion setting to keep the department ID and the tally information without deleting them.

Another Embodiment

It is possible to add functions or make various changes for the embodiment described above. For example, if a department ID that is designated as a deletion target in the UI screen 310 is associated with any user ID, the management UI control unit 207 may execute the following control. For example, the management UI control unit 207 (1) deletes only the department ID, (2) deletes the department ID and deletes associated user IDs, or (3) displays on the operation unit 105 an error message indicating that the department ID is being used and does not delete the department ID.

In addition, if deletion of all user IDs is instructed by the user, the CPU 101 (the management UI control unit 207) uses the API 403 or 404 to delete all user IDs and associated information from the user DB 202. In such a case, the CPU 101 may keep built-in user IDs that were registered at a time of shipping of the MFP 100 without deleting them. Furthermore, if the automatic deletion setting for department IDs is enabled, the CPU 101 uses the API 403 to delete all department IDs and associated information (count values for number of sheets for printing and copying) from the department DB 203. In such a case, the CPU 101 may keep and not delete a user ID and that was registered as built-in and associated department IDs.

In addition, if import of data to a respective DB is instructed using the UI screen 320, the CPU 101 may control the deletion processing so that deletion of department IDs is not performed after a user ID is deleted, even if the automatic deletion setting for department IDs is enabled. In other words, the CPU 101 selects and uses the API 404 instead of the API 403. This is because an effect expected by a user may possibly not be obtained, depending on an import order when importing data to the user DB 202 and the department DB 203. Specifically, if data imports are performed for the user DB 202 and the department DB 203 in this order, an issue does not occur. However, in a case of importing data to the department DB 203 and the user DB 202 in this order, an issue described below may occur.

When importing data to the user DB 202 and the department DB 203 in this order, the CPU 101 executes processing of the following (1) to (7) in this order.
 (1) Obtaining an import file for the user DB 202;
 (2) Deleting all user IDs from the user DB 202;
 (3) Deleting department IDs from the department DB 203 in conjunction with the deletion of user IDs;
 (4) Importing data to the user DB 202 from the import file;
 (5) Obtaining an import file for the department DB 203;
 (6) Deleting all user IDs from the department DB 203; and
 (7) Importing data to the department DB 203 from the import file.

In this case, no issue occurs because the user DB 202 and the department DB 203 are in a state of storing data obtained from respective import files.

In contrast, when importing data to the department DB 203 and the user DB 202 in this order, the CPU 101 executes processing of the following (1) to (7) in this order.
 (1) Obtaining an import file for the department DB 203;
 (2) Deleting all user IDs from the department DB 203;
 (3) Importing data to the department DB 203 from the import file;
 (4) Obtaining an import file for the user DB 202;
 (5) Deleting all user IDs from the user DB 202;
 (6) Deleting department IDs from the department DB 203 in conjunction with the deletion of user IDs; and
 (7) Importing data to the user DB 202 from the import file.

In this case, data that was stored in (imported into) the department DB 203 at processing (3) is deleted from the department DB 203 at processing (6). Accordingly, there is a result where it is not possible to successfully import data from a corresponding import file to the department DB 203, and a result expected by the user is not obtained.

Accordingly, if import of data is instructed using the UI screen 320, as described above, the CPU 101 does not delete department IDs after a user ID is deleted, even if the automatic deletion setting for department IDs is enabled. With this, it is possible to prevent failing to achieve a result expected by a user.

In addition, the login application 208 described above may be created by a vendor (a third-party vendor) different to the vendor of the MFP 100, and installed in the MFP 100. The API of the data access unit 204 may be published, and management of data in the user DB 202 and the department DB 203 may be entrusted to such a third-party vendor login application 208. Alternatively, the third-party vendor login application 208 may execute a proprietary management UI control unit that differs from the management UI control unit 207. In such a case, the built-in management UI control unit 207 of the MFP 100 is disabled so as to not function.

Here, a case where the third-party vendor login application 208 uses the API 401 or 403 of the data access unit 204 is envisioned. In such a case, when deletion of a department ID is performed in conjunction with deletion of a user ID by the API 401 or 403, an operation that does not follow the intention of a developer of the third-party vendor login application 208 may be performed. Accordingly, as APIs that are published for a third-party vendor, the APIs 402 and 404 which do not delete a department ID in conjunction with deletion of a user ID are required in addition to the APIs 401 and 403. Due to such a reason, the data access unit 204 of the embodiment described above implements the APIs 402 and 404 in addition to the APIs 401 and 403. Alternatively, configuration may be taken such that functions of the APIs 401 and 403 which delete a department ID in conjunction with deletion of a user ID are realized only by the management UI control unit 207 and not by the data access unit 204. Accordingly, even if the automatic deletion setting for department IDs is enabled, the APIs 402 and 404, which do not delete department IDs in conjunction with deletion of a user ID, are provided. By this, it is possible to increase a degree of freedom for design in the third-party vendor login application 208.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-029051, filed Feb. 21, 2018, which is hereby incorporated by reference herein in its entirety.

What is claimed is:

1. An image forming apparatus, comprising:
a printer;
at least one processor; and
at least one memory coupled to the at least one processor and having stored therein instructions that, when executed by the at least one processor, cause the at least one processor to function as:
a first saving unit configured to save, in a user database, a user ID used in user authentication processing and a department ID in association with each other;
a second saving unit configured to save, in a department database, the department ID and a number of sheets for print material printed by the printer in association with each other;
a first deletion control unit configured to, in conjunction with accepting a deletion instruction for deleting one or more user IDs saved in the user database, delete the one or more user IDs designated as deletion targets and one or more associated department IDs from the user database;
an identification unit configured to identify an unnecessary department ID which is not associated with any user ID after the deletion of the one or more user IDS, by excluding, from out of department IDs saved in the department database, a department ID that is not deleted from the user database by the deletion instruction, and
a second deletion control unit configured to delete the identified department ID from the department database.

2. The image forming apparatus according to claim 1, wherein
the identification unit identifies, as the unnecessary department ID, a department ID that is not associated with any user ID saved in the user database after the deletion of the one or more user IDs, from out of the department IDs saved in the department database.

3. The image forming apparatus according to claim 1, wherein
the second deletion control unit obtains a list of all department IDs saved in the department database as a first list, obtains a list of all department IDs saved in the user database after the deletion of the one or more user IDs as a second list, and identifies the unnecessary department ID based on a difference between the first list and the second list.

4. The image forming apparatus according to claim 3, wherein
the second deletion control unit identifies a department ID that is included in the first list and is not included in the second list as the unnecessary department ID.

5. The image forming apparatus according to claim 1, wherein the instructions further cause the at least one processor to function as a setting unit configured to make, in accordance with an instruction by a user, a deletion setting for deleting a department ID that has become unnecessary when deletion of a user ID is performed,
wherein the second deletion control unit
if the deletion setting has not been made, does not delete the unnecessary department ID from the department database after the deletion of the one or more user IDs by the first deletion control unti, and
if the deletion setting has been made, deletes the unnecessary department ID from the department database after the deletion of the one or more user IDs by the first deletion control unit.

6. The image forming apparatus according to claim 5, wherein the instructions further cause the at least one processor to function as an import unit capable of executing processing for deleting all user IDs saved in the user database and importing user ID data from a file that is an import source, and processing for deleting all department IDs saved in the department database and importing department ID data from a file that is an import source,
wherein, in a case where importing of user ID data is performed by the import unit, the second deletion control unit does not delete the unnecessary department ID from the department database after the deletion of the one or more user IDs by the first deletion control unit, even if the deletion setting has been made.

7. A method of controlling an image forming apparatus, the method comprising:
saving, in a user database, a user ID used in user authentication processing and a department ID in association with each other;
saving, in a department database, the department ID and a number of sheets for print material printed by a print unit in association with each other; and
performing deletion control to:
in conjunction with accepting a deletion instruction for deleting one or more user IDs saved in the user database, delete the one or more user IDs designated as deletion targets and one or more associated department IDs from the user database;
identify an unnecessary department ID which is not associated with any user ID after the deletion of the one or more user IDs, by excluding, from out of department IDs saved in the department database, a department ID that is not deleted from the user database by the deletion instruction; and delete the identified department ID from the department database.

8. A non-transitory computer-readable storage medium storing a computer program for causing a computer to execute a method of controlling an image forming apparatus, the method comprising:

saving, in a user database, a user ID used in user authentication processing and a department ID in association with each other;

saving, in a department database, the department ID and a number of sheets for print material printed by a print unit in association with each other; and performing deletion control to:

in conjunction with accepting a deletion instruction for deleting one or more user IDs saved in the user database, delete the one or more user IDs designated as deletion targets and one or more associated department IDs from the user database;

identify an unnecessary department ID which is not associated with any user ID after the deletion of the one or more user IDs, by excluding, from out of department IDs saved in the department database, a department ID that is not deleted from the user database by the deletion instruction; and delete the identified department ID from the department database.

* * * * *